No. 671,375. Patented Apr. 2, 1901.
E. B. GALLAHER.
CARBURETER.
(Application filed July 5, 1900.)
(No Model.)
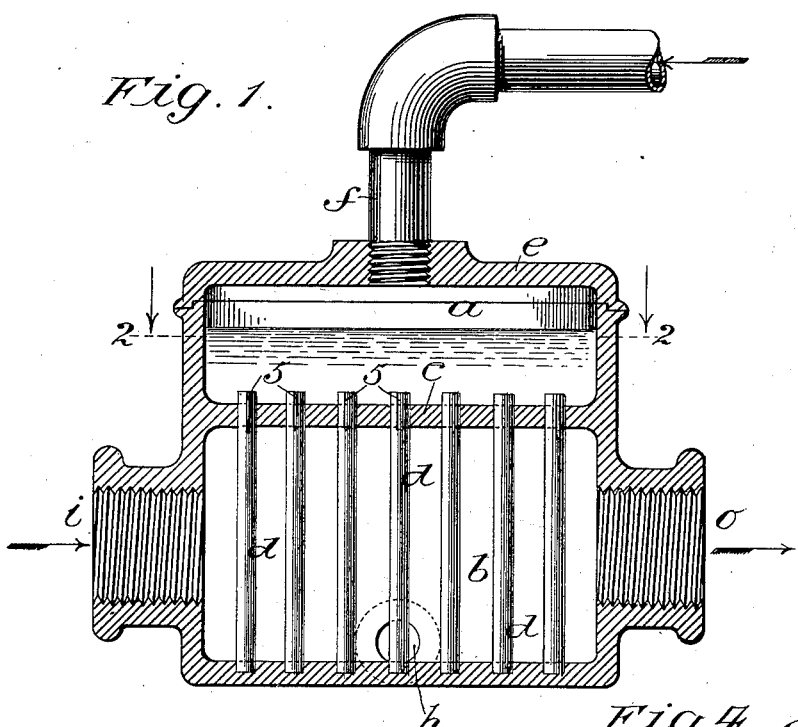
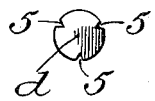
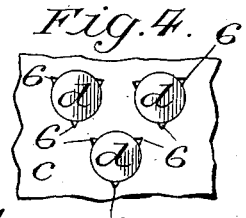
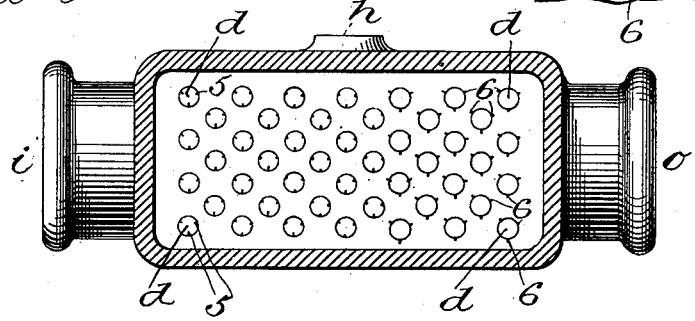
Witnesses
Edward A. Rowland
George Barry Jr.
Inventor
Edward Rexel Gallaher
By his Attorney
Brown & Seward

UNITED STATES PATENT OFFICE.

EDWARD BEACH GALLAHER, OF NEW YORK, N. Y.

CARBURETER.

SPECIFICATION forming part of Letters Patent No. 671,375, dated April 2, 1901.

Application filed July 5, 1900. Serial No. 22,542. (No model.)

*To all whom it may concern:*

Be it known that I, EDWARD BEACH GALLAHER, a citizen of the United States, and a resident of the borough of Manhattan, in the city and State of New York, have invented a new and useful Improvement in Carbureters, of which the following is a specification.

This invention, though applicable to the carbureting of air or gas for any purpose, is especially designed for carbureting air to be used in gas-engines.

The object of the improvement is to provide for presenting the carbureting liquid in an extremely thin and constantly-renewed film over very extensive surfaces which are included within a comparatively small space, while the air or gas to be carbureted circulates around and between said surfaces in contact with the said liquid.

The invention is illustrated in the accompanying drawings, in which—

Figure 1 represents a vertical section of a carbureter embodying my invention; Fig. 2, a horizontal section in the line 2 2 of Fig. 1. Figs. 3 and 4 are detail views which will be hereinafter explained.

$a$ $b$ in the drawings designate a box or casing divided by a horizontal partition $c$ into an upper chamber or reservoir $a$ and a lower chamber $b$. The lower chamber $b$ has an inlet $i$ at one end for the air to be carbureted and an outlet $o$ at the other end for the carbureted air. The upper chamber or reservoir $a$ has a removable cover $e$ and is provided with an inlet $f$, through which is introduced a constant supply of the carbureting liquid, which may be regulated in any suitable manner.

$d$ $d$ are numerous rods, preferably of metal—wire, for example—proximately grouped together within the chamber $b$. These rods are inserted through holes in the partition $c$ and stepped into holes or notches in the bottom of the chamber, from which they project upward a short distance through the partition $c$ into the reservoir $a$, as shown in Fig. 1.

In order to provide for a very slight flow of the carbureting liquid from the reservoir $a$ down over the exterior of the rods $d$—a mere trifling leakage, so to speak—the said rods are fitted snugly to the holes provided for them in the partition $c$, and very fine longitudinal grooves 5 (see Fig. 3, which is a top view of one of said rods) are provided in the upper parts of the said rods which are within and above the said holes, or instead of such grooves 5 in the rods similar grooves 6 may be provided in the sides of the said holes, as shown in Fig. 4, which represents in plan a portion of the partition $c$ and several rods $d$ on a larger scale than Fig. 2, the said grooves 5 6 forming passages between the rods and the holes in the partition; but such passages might be formed by simply fitting the rods loosely to the holes.

The operation is as follows: The carbureting liquid being supplied to the reservoir $a$ in sufficient quantity and air or gas being caused to pass through the lower chamber $b$, the liquid flows constantly through the grooves 5 or 6 in very fine streams and flows over and down the exterior surfaces of the rods $d$ in such constant but infinitesimally thin films as to be rapidly absorbed by the air or gas circulating between and on all sides of the said rods. The supply of the liquid may be so regulated to the air or gas as to produce more or less complete saturation of the latter and to be completely absorbed; but in order to prevent any accumulation of liquid on the bottom of the chamber $b$ a suitable escape-outlet $h$ is provided.

What I claim as my invention is—

1. In a carbureter, a chamber having an inlet and an outlet for the air or gas to be carbureted, a series of rods arranged in said chamber between its inlet and outlet and means for supplying carbureting liquid to the exterior surfaces of said rods from the upper ends thereof, all in combination substantially as herein described.

2. A carbureter comprising an upper reservoir for the carbureting liquid, a lower chamber with inlet and outlet for the air or gas to be carbureted, a partition between the said reservoir and chamber and a group of rods arranged within said chamber and projecting upward within holes in said partition with passages between them and the sides of said holes, substantially as herein described.

3. A carbureter comprising an upper reservoir for the carbureting liquid, a lower chamber with inlet and outlet for the air or gas to be carbureted, a partition in which are numerous holes between said chamber and reservoir, and a group of rods stepped into the bottom of said chamber and projecting upward through said holes and having in their upper parts grooves for the downward passage of the liquid, substantially as herein described.

In testimony that I claim the foregoing as my invention I have signed my name, in presence of two witnesses, this 2d day of July, 1900.

EDWARD BEACH GALLAHER.

Witnesses:
FREDK. HAYNES,
EDWARD VIESER.